(12) United States Patent
Hausmann

(10) Patent No.: US 10,337,643 B2
(45) Date of Patent: Jul. 2, 2019

(54) VALVE DEVICE FOR A PRESSURIZED GAS CONTAINER

(71) Applicant: NISSAN MOTOR CO., LTD., Yokohama-shi, Kanagawa (JP)

(72) Inventor: Philipp Hausmann, Kirchheim (DE)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 35 days.

(21) Appl. No.: 15/038,852

(22) PCT Filed: Nov. 15, 2014

(86) PCT No.: PCT/EP2014/003062
§ 371 (c)(1),
(2) Date: May 24, 2016

(87) PCT Pub. No.: WO2015/078564
PCT Pub. Date: Jun. 4, 2015

(65) Prior Publication Data
US 2017/0023150 A1    Jan. 26, 2017

(30) Foreign Application Priority Data
Nov. 26, 2013   (DE) .......................... 10 2013 019 811

(51) Int. Cl.
*F16K 31/50* (2006.01)
*F16K 1/30* (2006.01)
(Continued)

(52) U.S. Cl.
CPC .............. *F16K 31/508* (2013.01); *F16K 1/12* (2013.01); *F16K 1/302* (2013.01); *F16K 31/0655* (2013.01); *F17C 1/005* (2013.01); *F17C 13/04* (2013.01); *F17C 2205/0326* (2013.01); *F17C 2205/0329* (2013.01); *F17C 2205/0394* (2013.01); *F17C 2221/012* (2013.01);
(Continued)

(58) Field of Classification Search
CPC .......... F16K 31/508; F16K 1/302; F16K 1/12; F16K 31/0655; F17C 13/04; F17C 1/005; F17C 2270/0763; F17C 2205/0329; F17C 2205/0394; F17C 2221/012; F17C 2223/036; F17C 2205/0326; Y02E 60/321
USPC .............................. 251/221, 77, 215; 74/225
See application file for complete search history.

(56) References Cited

U.S. PATENT DOCUMENTS 2,238,401 A * 4/1941 Shaw .................... H01F 7/1607
                                                       236/75
2,366,006 A   12/1944 Culver
(Continued)

FOREIGN PATENT DOCUMENTS

EP    1 682 801 B1    3/2011
JP    61-104876 U     7/1986
(Continued)

*Primary Examiner* — Kevin F Murphy
*Assistant Examiner* — Patrick C Williams
(74) *Attorney, Agent, or Firm* — Foley & Lardner LLP

(57) ABSTRACT

Valve device (4) for a pressurized gas container (2), having a valve housing and functional elements which are introduced into the valve housing. One of the functional elements is an extraction valve (6) having a valve body (5) that is movable between an open position and a closed position. A manual actuating element (12) is provided for moving the valve body (5) into an at least partially open position.

13 Claims, 2 Drawing Sheets

(51) Int. Cl.
  *F16K 1/12*   (2006.01)
  *F17C 13/04*  (2006.01)
  *F17C 1/00*   (2006.01)
  *F16K 31/06*  (2006.01)

(52) U.S. Cl.
  CPC   *F17C 2223/036* (2013.01); *F17C 2270/0763* (2013.01); *Y02E 60/321* (2013.01)

(56) References Cited

U.S. PATENT DOCUMENTS

| | | | |
|---|---|---|---|
| 2,829,861 A | | 4/1958 | Wright |
| 2,988,321 A | * | 6/1961 | Gilmont .............. F16K 27/0254 |
| | | | 251/214 |
| 4,106,747 A | * | 8/1978 | Malacheski ............ F16K 1/487 |
| | | | 251/215 |
| 7,210,496 B2 | * | 5/2007 | Suzuki .................... F16K 1/302 |
| | | | 137/338 |
| 7,722,009 B2 | | 5/2010 | Perthel et al. |
| 8,066,256 B2 | * | 11/2011 | Platz ..................... F16K 31/404 |
| | | | 251/129.03 |
| 2005/0103382 A1 | | 5/2005 | Carter |
| 2007/0272891 A1 | | 11/2007 | Perthel et al. |
| 2013/0175462 A1 | | 7/2013 | Suzuki et al. |

FOREIGN PATENT DOCUMENTS

| | | |
|---|---|---|
| JP | 2001-330165 A | 11/2001 |
| JP | 2012-2252 A | 1/2012 |

\* cited by examiner

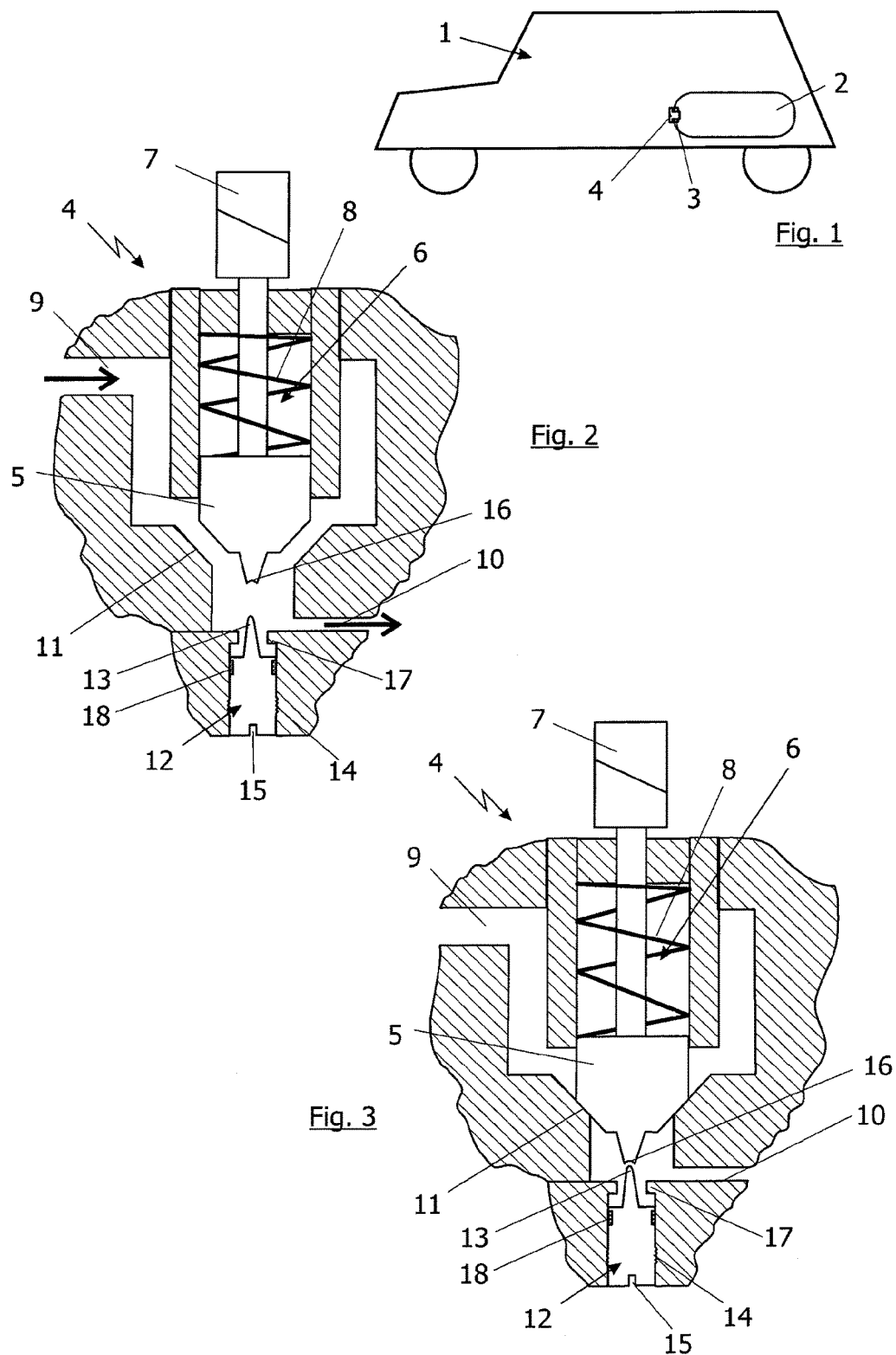

VALVE DEVICE FOR A PRESSURIZED GAS CONTAINER

The invention relates to a valve device for a pressurized gas container of the type defined in greater detail according to the preamble of claim 1.

Valve devices for pressurized gas containers, also referred to as so-called on-tank valves (OTV), are known from the prior art. Reference may be made to US 2005/0103382 A1, for example. In addition, an electromagnetic valve in which a piston as the valve body is moved back and forth between an open position and a closed position is known from EP 1 682 801 B1.

The object of the present invention is to provide, in addition to the electromagnetic control for removing gas, an option for discharging gas manually from the pressurized gas store if this is necessary, for example for maintenance, for safety reasons, or the like.

This object is achieved according to the invention by a valve device having the features in the characterizing part of claim 1. Advantageous embodiments and refinements result from the subclaims that are dependent on claim 1. In addition, a particularly preferred use of the valve device according to the invention is set forth in claim 10.

For the valve device according to the invention, this at least one extraction valve has a valve body which is movable between an open position and a closed position. A manual actuating element is provided which is designed in such a way that it is able to move the valve body into an at least partially open position. This provides an extremely simple and efficient option for manually actuating the valve device for emptying. As a result of the valve body, which is present anyway, being moved into its open position via the manual actuating element, use may also be made of the mechanism for sealing, in particular its valve seat, which is present anyway for the valve body. An additional valve seat having additional openings within the valve device, which would mechanically weaken the valve and which represent additional interfaces that must be sealed off, is therefore not necessary. Rather, for the valve body which is present anyway, use may also be made of its functionality as an extraction valve as well as the functionality of a manually actuated purge valve.

In another very advantageous embodiment of the concept, it is provided that the valve body has an electromagnetic actuating device and a restoring spring, the restoring spring moving the valve body into the closed position. This design in which the valve body is moved via an electromagnetic actuating device is known per se. In addition, the valve body has a restoring spring which in the embodiment variant illustrated here moves the valve body into the closed position. The extraction valve is thus normally closed. The normally closed valve, body, in the present case closed against the force of the restoring spring, may be moved by the manual actuating element into an open or at least partially open position, so that gas is able to escape along the valve body in its open or partially open position and flow via the customary emptying paths which are otherwise provided for withdrawing the gas during regular operation.

According to one very advantageous embodiment of the valve device according to the invention, the valve body may be designed as a piston of the extraction valve. Such a piston, or shutoff piston, which may be moved between an open and a closed position is known, for example, from the prior art cited at the outset in the form of EP 1 682 801 B1. This design is advantageous in particular for valve devices used in high-pressure tanks for hydrogen, which is stored at a nominal pressure of 700 bar. The functionality of the valve device according to the invention, described with reference to an arbitrary valve body, may now be achieved in particular using such a piston or shutoff piston as the valve body. This has the major advantage that the complex design, which is present anyway, need be expanded only by the mechanical actuating device, and no additional valve body and/or valve seat for manual emptying is required since the piston is also used for this purpose.

In one advantageous refinement of the valve device according to the invention, it may also be provided that the manual actuating element has a thread, so that a rotary motion is converted into an axial motion of the actuating element in the direction to/from the valve body. Such an actuation is particularly simple and efficient, since a rotary motion of the actuating element may take place, for example, via a mechanical interface and an appropriate tool such as a hexagon socket, a screwdriver, or the like.

In another very advantageous embodiment, it is also provided that the thread is formed externally on a sleeve which has a rotationally movable pin inside, which is connected to the threaded sleeve via an axial stop. This design in particular is a major advantage, since decoupling of the axial motion and the rotary motion takes place. The sleeve may then be easily and efficiently screwed in and out of the thread. The pin, which is connected to the valve body as a mechanical actuating element, does not have to co-rotate, and instead may rotate within the sleeve. As a result, the pin is not rotationally moved at its contact surface against the valve body, the contact surface ideally being formed by a rounded tip and a key-shaped depression for accommodating this tip. Excessively high forces and wear are thus avoided, in particular during the interaction of different materials between the actuating element and the valve body.

In one advantageous refinement of the valve device according to the invention, it may also be provided that the manual actuating element has a stop, so that only one predefined axial path is possible. This is possible in a design having a threaded sleeve as well as in the one-piece design of the manual actuating element. This refinement has the major advantage that the stop may securely and reliably prevent the valve body from moving too far, which could possibly result in damage in the area of the extraction valve or its actuator system.

In another very advantageous embodiment, it is also provided that the predefined axial path allows only one stroke of the valve body, which is smaller than the stroke during the regular opening of the valve body for removing gas, and which in particular is less than 1 mm. Such a small stroke of the valve body, in particular less than 1 mm, preferably approximately 0.5 mm, on the one hand ensures that the required stroke for manually emptying may be achieved in each case, and on the other hand that only a comparatively small cross section through which flow may pass is opened up due to only partially opening the regular extraction valve via the manual actuation of the valve body, so that a throttle function is automatically achieved during the manual discharge, which corresponds, for example, to a borehole equivalent of approximately 2 mm diameter (nominal diameter). This is a major advantage, since the manual emptying of the pressurized gas container may thus take place in a very controlled manner.

In one advantageous refinement of the valve device according to the invention, it is also provided that the mechanical actuating element is sealed off from the valve housing by means of a radial seal. Such sealing via a radial seal may be achieved very easily and with a high level of seal-tightness, in particular when the seal has a sealing ring and a support ring. It is thus possible on the one hand to implement a smoothly operating mechanical actuating device, and on the other hand to ensure the seal with respect to the surroundings in each case, since the region of the actuating device is appropriately acted on with pressure, depending on the position of the valve body and the position of the actuating device. Compared to the axial seal which is also conceivable in principle, the radial seal has the advantage of simple installation and long-term durability, since it is not as strongly affected by rotary motions as is the case for an axial seal.

The particularly preferred use of the valve device according to the invention for a pressurized gas container is on a pressurized gas container in which hydrogen is stored at a nominal pressure of greater than 600 bar. The valve device according to the invention is particularly advantageous for a hydrogen store which stores the hydrogen under a very high nominal pressure to compensate for the drawback of its low density. The valve device may efficiently meet the necessary safety aspects, and at the same time allows a high level of seal-tightness of the system due to the fact that it engages on the valve body of the extraction valve and does not require a dedicated seal with its own valve seat. This may be achieved with a minimum outlay of components and a minimum number of interfaces to be sealed, resulting in a major advantage for hydrogen, which is correspondingly difficult to compress.

The valve device according to the invention may preferably be utilized in a pressurized gas container which is used for storing hydrogen in a vehicular application, in particular in a fuel cell vehicle.

Further advantageous embodiments of the valve device according to the invention result from the other dependent subclaims, and are made clear based on the exemplary embodiment, which is described in greater detail below with reference to the figures, wherein:

FIG. 1 shows a vehicle having a pressurized gas container and a valve device;

FIG. 2 shows one possible embodiment of the valve device in the open state of the extraction valve;

FIG. 3 shows the view according to the illustration in FIG. 2 with the extraction valve closed;

Figure 4:
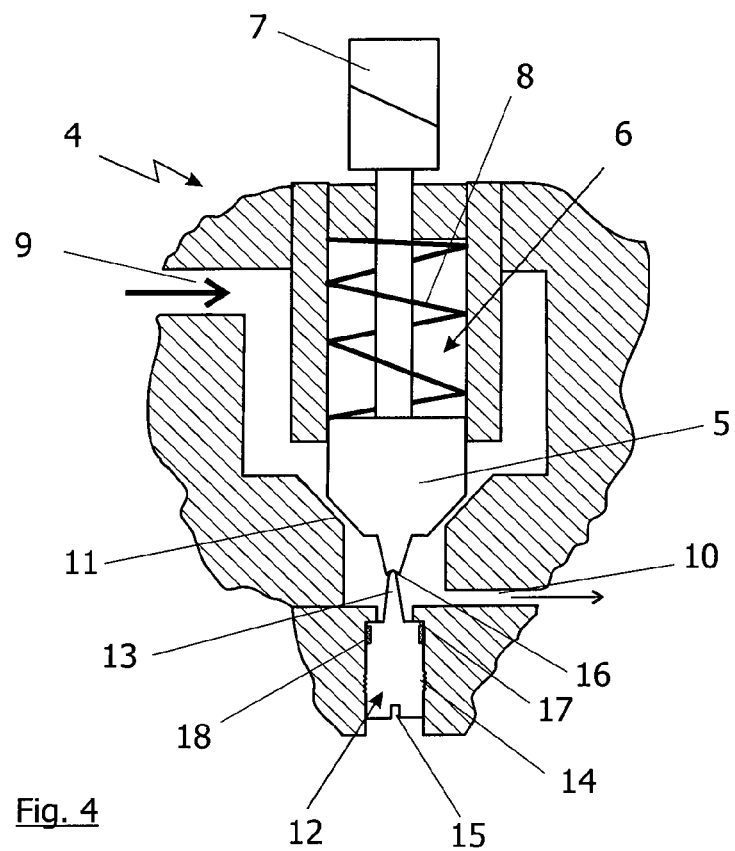
FIG. 4 shows the illustration according to FIG. 2 with the extraction valve manually opened.

A vehicle 1, for example a fuel cell vehicle, is apparent in the illustration in FIG. 1. This vehicle may include a fuel cell system in which at least one fuel cell, in particular a stack of PEM fuel cells, is provided. These fuel cells are supplied on the cathode side with air as the oxygen supplier, and are supplied on the anode side with hydrogen. This hydrogen originates from a pressurized gas container 2 which is schematically indicated in the vehicle 1. The pressurized gas container has, for example, a design which is known per se and customary, in which a closing element, the so-called BOSS, is situated at least on one side of the pressurized gas container. In the area of this closing element, which is denoted by reference numeral 3, a valve device 4 is present which may include multiple functions, and in particular an extraction valve may be provided as a functional element. Further functional elements such as a pressure relief valve, a manual shutoff valve, a temperature sensor, a pressure sensor, or the like are conceivable and are known from the general prior art. These elements do not play a role in the functionality of the present invention, and therefore are not discussed in greater detail.

A detail of the valve device 4 is apparent in the illustration in FIG. 2. In the detail of the valve housing illustrated here, a valve body 5 of an extraction valve 6 is apparent which is controlled via an electromagnetic actuator 7. In addition to the electromagnetic actuator 7, a restoring spring 8 is also apparent which moves the valve body 5 into the closed position illustrated in FIG. 3 when no force is applied by the electromagnetic actuator 7. One side of the valve body 5, for example the supply line 9 illustrated at the top left in FIG. 2, is connected to the interior of the pressurized gas container. The gas may be conducted, for example, to the previously mentioned fuel cell system or to pressure regulation and metering devices thereof via an exhaust line 10 on the other side of the valve body 5. This design is understood to be strictly by way of example. Instead of the valve body 5, a piston could also be provided in the extraction valve 6, as described, for example, in the prior art cited at the outset in the form of EP 1 682 801 B1. This is also of secondary importance for the functionality of the invention.

The illustration in FIG. 3 shows the same design as discussed above, in the closed state. The valve body 5 is in sealing engagement with a valve seat 11, a metallic contact between the valve body 5 and the valve seat 11 being indicated here strictly by way of example. Alternatively, seals could just as well be present. This is also of secondary importance for the basic functionality of the invention, for which reason a detailed illustration of the seal in the area between the valve seat 11 and the valve body 5 has been dispensed with. In addition, a manual actuating element 12 having a plunger 13 and a thread 14 is apparent in FIGS. 2 and 3. The actuating element 12 may be rotationally moved via a mechanical interface 15 for a tool, so that the rotary motion is converted into an axial motion via the thread 14. As a result, the actuating element 12 and its plunger 13 may be moved in the direction of the valve body 5. When the actuating element 12 via the tip of its plunger 13 contacts a corresponding receiving cavity 16 in the valve body 5, upon further rotation of the actuating element 12 the valve body 5 is lifted off from its valve seat 11 against the force of the restoring spring 8, specifically, until either the actuation of the actuating element 12 is stopped, or the actuating element strikes a housing projection 17 which is used as a stop. This position is illustrated in FIG. 4, in which it is apparent that the valve body 5 has been partially moved from its closed position in the direction of the open position. This opens up a gap between the valve body 5 and the valve seat 11 through which gas may pass from the area of the inflow opening 9 into the area of the outflow opening 10, and may thus flow out of the pressurized gas container 2. The position of the extraction valve 6, which is normally closed via the restoring spring 8, may thus be changed by the manual actuating element 12 in such a way that the position is at least partially open. A manual emptying function in the valve device 4 may be achieved in this way. This function makes use of the valve body 5 which is present anyway in the extraction valve 6, as well as the sealing mechanisms which are present at that location anyway, so that a manual emptying function may be integrated into the valve device 4 with minimum effort and minimum risk with regard to impairment of the seal.

Since the area which is provided with the manual actuating element 12 is also under pressure when the valve device 4 is open, a radial seal 18 which has a sealing ring and a support ring, for example, is provided in the region of the manual actuating element 12. The radial seal may ensure very good seal-tightness despite the radial rotation which occurs, even with frequent actuation of the manual actuating element 12. In particular, the radial seal 18 is not under pressure when the valve body 12 is closed, so that for this case the radial seal 18 does not result in an additional risk of leakage.

Figure 5:
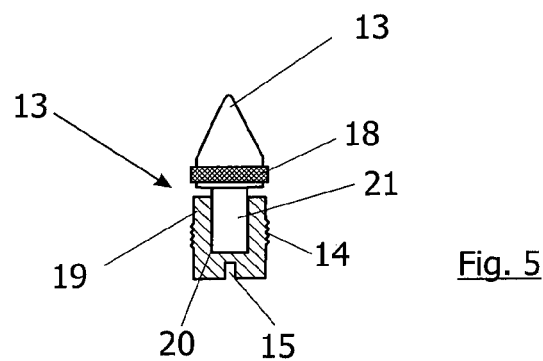
FIG. 5 shows an alternative embodiment of the manual actuating element.

The manual actuating element 12, which is used solely for manually emptying the pressurized gas store 2, is designed for a much smaller number of cycles than the movement of the valve body 5 itself, which is typically moved in a pulsing manner during the removal of gas and is continually opened and closed. Nevertheless, undesirable friction may occur over time at the point of contact between the tip of the plunger 13 and the cavity 16 in the valve body 5, possibly resulting in material wear. To counteract this, it may be provided that the actuating element 12 is designed in such a way that the axial motion is decoupled from the rotary motion. This is apparent by way of example in the illustration in FIG. 5, in which a sleeve 19 is provided. The sleeve 19 bears the thread 14 on the outer side, and has a borehole 20 on the inner side. A pin 21 which is rotationally movable in the borehole 20 extends into this borehole 20. The lower end of the borehole 20 is used as a type of stop for the pin 21, so that in the event of an upward rotary motion of the sleeve 19, the pin 21 is carried along in the axial direction, and in the event of a downward rotary motion of the sleeve 19, the pin 21 is moved due to the force of gravity, and in particular the restoring spring 8 is moved indirectly via the valve body 5, out of the manually open position of the valve body 5. At its upper end the pin 21 has the plunger 13 and, by way of example, the radial seal 18. The valve body 5 is then lifted off from its valve seat 11 via the plunger 13 as needed, similarly as for the above-described embodiment variant. As a result of the rotary motion now taking place between the sleeve 19 and the pin 21 at least when the plunger 13 lies against the valve body 5, the wear and friction may be minimized by appropriate lubrication and/or material pairing. The contact of the tip of the plunger 13 in the area of the cavity 16 in the valve body 5 then ideally takes place without rotary motion, thus reducing the friction and wear.

As is apparent from the illustration in FIG. 4, which shows the manually opened state of the valve body 5, the gap between the valve body 5 and the valve seat 11 is much smaller than in the open state of the extraction valve 6 illustrated in FIG. 2. This is intentional, with the movement of the valve body 5 in particular being less than 1 mm. Only a comparatively small gap is thus opened up between the valve body 5 and the valve seat 11. This results in a throttle effect during the manual emptying of the pressurized gas container 2, since the available cross section is correspondingly small. The emptying may thus take place in a very targeted manner, which is advantageous in particular for gas that is under high pressure, such as hydrogen, which is stored at a nominal pressure of 700 bar.

The invention claimed is:

1. A valve device for a pressurized gas container, having a valve housing and functional elements which are introduced into the valve housing, one of the functional elements being an extraction valve having a valve body that is movable between an open position and a closed position,
wherein a manual actuating element is provided for moving the valve body into an at least partially open position, the manual actuating element configured to move towards the valve body in an engaging direction and away from the valve body in a disengaging direction,
and wherein the valve housing includes a stop which is structured to restrict movement of the manual actuating element in the engaging direction,
and wherein the stop is configured to permit one stroke of the valve body, which is smaller than a stroke during a regular opening of the valve body for removing gas,
wherein the manual actuating element includes:
a sleeve that has a borehole on an inner side thereof;
a pin rotationally movable in the borehole that extends into the borehole; and
a plunger provided at an upper end of the pin which contacts the valve body,
wherein the sleeve is configured to rotate relative to the pin, and the pin is coupled to the sleeve, and wherein the pin is axially movable relative to the sleeve while the manual actuating element is moving in the disengaging direction.

2. The valve device according to claim 1,
wherein the valve body has an electromagnetic actuating device and a restoring spring, the restoring spring moving the valve body into the closed position.

3. The valve device according to claim 1,
wherein the valve body is a piston of the extraction valve.

4. The valve device according to claim 1, wherein the manual actuating element has a thread, so that rotary motion is converted into axial motion of the actuating element in the engaging direction and the disengaging direction.

5. The valve device according to claim 4,
wherein the thread is formed externally on the sleeve, and the pin is rotationally movable inside the sleeve, and the pin is coupled to the sleeve via an axial stop.

6. The valve device according to claim 1,
wherein the manual actuating element has a mechanical interface for accommodating a tool.

7. The valve device according to claim 1,
wherein the manual actuating element is sealed off from the valve housing by a radial seal.

8. A gas system, comprising:
the valve device according to claim 1,
wherein the pressurized gas container is configured to store hydrogen at a nominal pressure of greater than 600 bar.

9. The gas system according to claim 8,
wherein the pressurized gas container is configured to store hydrogen in a fuel cell vehicle.

10. The valve device according to claim 1,
wherein rotary motion takes place between the sleeve and the pin at least when the plunger lies against the valve body.

11. The valve device according to claim 1, wherein the pin is axially movable within the borehole.

12. The valve device according to claim 2, further comprising:
a cavity configured to receive the manual actuating element, and
wherein the manual actuating element is configured to rotate in the cavity so as to cause the valve body to lift off from a valve seat to move against a force of the restoring spring.

13. A valve device for a pressurized gas container, comprising:

a valve housing configured to house components therein, one of the components being an extraction valve having a valve body that is movable between a first position and a second position, a manual actuator structured to move the valve body into an at least partially open position, the manual actuator further configured to move towards the valve body in an engaging direction and away from the valve body in a disengaging direction, and a stop provided in the valve housing and structured to restrict movement of the manual actuator in the engaging direction, and to permit a manual stroke of the valve body, which is smaller than a stroke during regular opening of the valve body when gas is removed from the pressurized gas container, wherein the manual actuator includes:

a sleeve that has a borehole;

a pin rotationally movable in the borehole; and a plunger provided at an upper end of the pin which contacts the valve body, wherein the sleeve is configured to rotate relative to the pin, and the pin is coupled to the sleeve, and wherein the pin is axially movable relative to the sleeve while the manual actuator is moving in the disengaging direction.

* * * * *